United States Patent
Ritter

(10) Patent No.: US 7,017,983 B2
(45) Date of Patent: Mar. 28, 2006

(54) METHOD AND APPARATUS FOR MOVING MULTIPART SLIDING ROOF FOR A MOTOR VEHICLE

(75) Inventor: Bernhard Ritter, Pforzheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/634,996

(22) Filed: Aug. 6, 2003

(65) Prior Publication Data

US 2004/0104606 A1    Jun. 3, 2004

(30) Foreign Application Priority Data

Aug. 6, 2002    (DE)    .................. 102 35 901

(51) Int. Cl.
*B60J 7/057*    (2006.01)

(52) U.S. Cl. .................. 296/223; 296/221; 296/220.01

(58) Field of Classification Search ................ 296/214, 296/220.01, 216.01, 221, 223
See application file for complete search history.

(56) References Cited

U.S. PATENT DOCUMENTS

| | | | |
|---|---|---|---|
| 5,372,401 A * | 12/1994 | Odoi et al. .................. 296/214 |
| 5,558,388 A * | 9/1996 | Furst et al. .............. 296/107.2 |
| 5,734,727 A * | 3/1998 | Flaherty et al. ................ 381/86 |
| 5,749,617 A * | 5/1998 | Weissrich et al. ...... 296/107.19 |
| 6,174,025 B1 * | 1/2001 | Henderson et al. ......... 296/217 |
| 6,425,629 B1 * | 7/2002 | Chubb et al. ................ 296/215 |
| 6,443,520 B1 | 9/2002 | Schmaelzle et al. ... 296/216.08 |
| 6,592,178 B1 * | 7/2003 | Schober et al. ............. 296/214 |
| 6,688,681 B1 * | 2/2004 | Birt ........................... 296/211 |
| 6,688,683 B1 * | 2/2004 | Kreiner et al. .............. 296/221 |
| 6,761,396 B1 * | 7/2004 | Ohtsu et al. ................ 296/221 |

FOREIGN PATENT DOCUMENTS

DE    199 41 984    10/2000

* cited by examiner

*Primary Examiner*—Dennis H. Pedder
(74) *Attorney, Agent, or Firm*—Crowell & Moring LLP

(57) ABSTRACT

A method and apparatus for moving a multipart sliding roof for a motor vehicle has a first angularly movable roof section, and at least a second and third roof section movable in the longitudinal direction of the vehicle for the positioned closing and opening-up of a roof opening. The longitudinally movable roof sections are controllable by means of an operating element for the selection of different defined roof positions, in which case, by means of the operating element, at least six switching positions and thus six different positions of the individual roof sections can be selected. After the selection of different switching positions by the operating element, the movement of different parts of the multipart sliding roof is carried out in a restrictedly controlled manner, without their movement having been selected by the operating element.

13 Claims, 2 Drawing Sheets

METHOD AND APPARATUS FOR MOVING MULTIPART SLIDING ROOF FOR A MOTOR VEHICLE

BACKGROUND OF THE INVENTION

This application claims the priority of Application No. 102 35 901.6. filed in Germany on Aug. 6, 2002, the disclosure of which is expressly incorporated by reference herein.

The invention relates to a method of moving a multipart sliding roof for a motor vehicle, as known, for example, from German Patent Document DE 199 41 984 C1 (corresponding U.S. Pat. No. 6,443,520). This known multipart sliding roof has a first angularly moved roof section and at least a second and third roof section movable in the longitudinal direction of the vehicle, for the positioned closing and opening-up of a roof opening. These movable roof sections are followed by a fourth fixed roof section. The movable roof sections and the wind deflector can each be controlled separately in order to implement different roof openings.

The method and apparatus according to the invention provides different possibilities of controlling the individual roof sections and the wind deflector, which results in a correspondingly coordinated movement of the individual roof sections in order to increase the safety of the vehicle occupants and, for example, ensure a limitation of the closing force.

As a result of the additional measures described herein and in the claims, advantageous further developments and improvements of the method according to the invention can be achieved. Thus, when the roof elements are constructed as transparent components, a sun blind can additionally be provided which also, in addition to the inherent control by way of an assigned switch, during the operation of the roof modules, is moved into an open position by way of a restricted control. It is therefore avoided that at high speeds the sun blind is exposed to excess stress when the roof is open.

The coupling of the drive for the wind deflector with the drive for a first roof section to be opened permits a minimizing of the noise-caused stress.

The providing of a rotary switch for the selection of the individual possible roof positions has the advantage that any roof position can be switched by means of a single switch. The individual switching points are arranged such that the different conditions are present for a movement of the individually movable roof sections in a position to be entered sequentially in a logical manner. The rotary switch advantageously has discrete haptic switching points for defined positions.

Further details of the invention are illustrated in the drawing and will be explained in the following description.

Other objects, advantages and novel features of the present invention will become apparent from the following detailed description of the invention when considered in conjunction with the accompanying drawings.

DETAILED DESCRIPTION OF THE DRAWINGS

Figure 1:
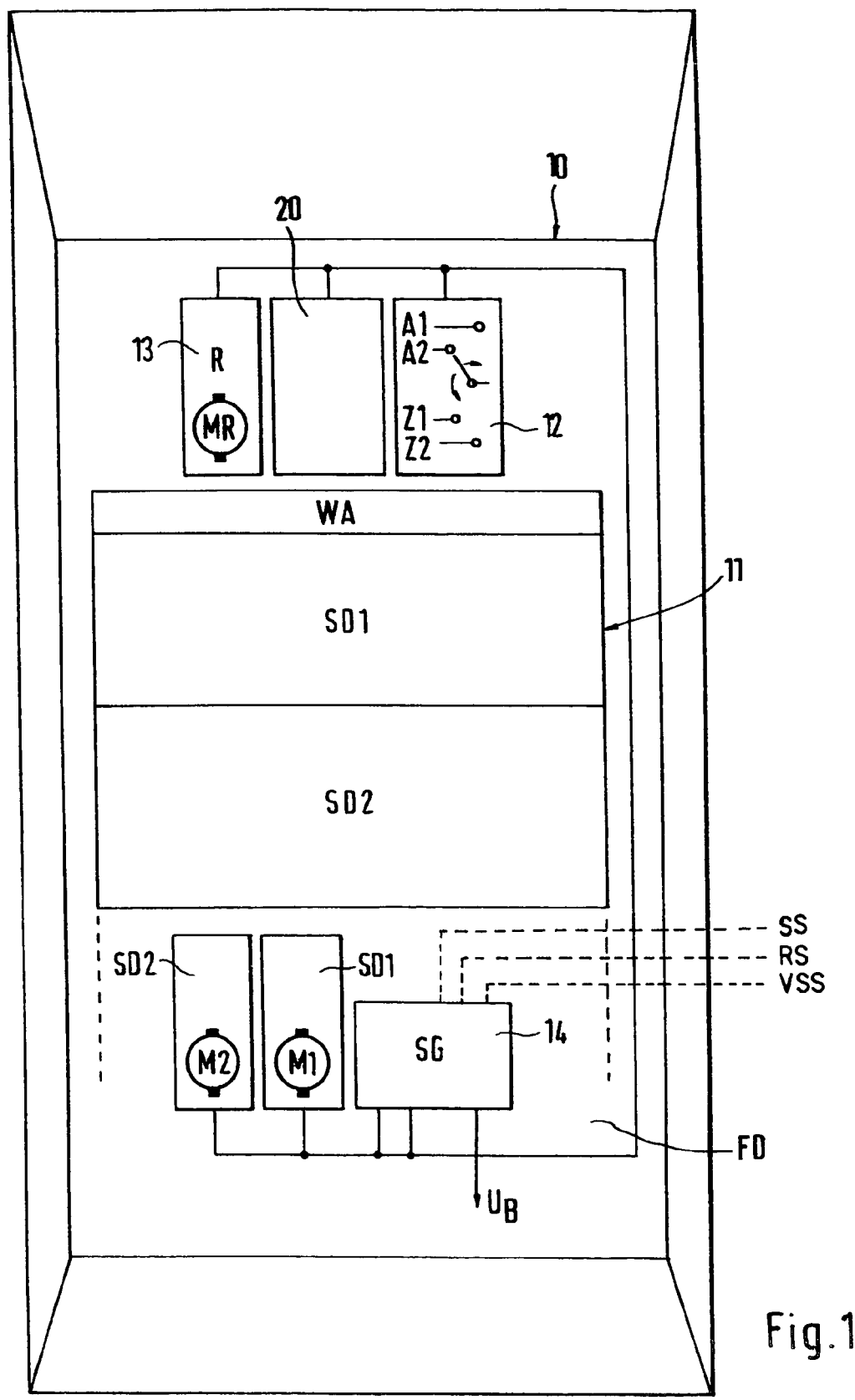
FIG. 1 is a schematic view depicting an arrangement for the cabling and controlling of a multipart sliding roof of a vehicle according to preferred embodiments of the present invention.

FIG. 1 is a basic diagram of the arrangement of the individual components for controlling the multipart sliding roof, in which case, for reasons of clarity, the ratios of sizes were not taken into account. The vehicle and the vehicle roof respectively are shown here only schematically in the form of rectangles, the rectangle 10 representing the roof of the vehicle. A multipart sliding roof 11 is integrated in the vehicle roof 10, which sliding roof 11 includes a wind deflector WA, a first sliding roof part SD1 movable in a longitudinal direction, and a second sliding roof part SD2 movable in a longitudinal direction. These movable roof sections are followed by a fixed roof section FD, which is illustrated as a section indicated by a broken line in FIG. 1.

All roof sections may also have a transparent construction. In this case, a sun blind R, which is shown in FIGS. 3A to 3F, is arranged below the multipart sliding roof. This sun blind R is controlled by a rocker-type key 12 which has four different switching points. These four different switching points consist of two switching points A1 and A2 for the OPEN position and two switching points Z1 and Z2 for the SHUT position. This means that a closing of the switching contact A1 causes a movement of the blind as long as the rocker key 12 is operated, while a continued movement of the rocker key beyond the switching point A1 to the switching point A2 causes a movement of the sun blind without the requirement that the rocker switch 12 has to be operated continuously. For a closing of the sun blind R, the same applies analogously to the switching points Z1 and Z2. An operation of the switching contact Z1, by means of the so-called "keying" function, causes a blind movement, as long as the rocker key 12 is being pressed. The switching point Z2 is called a "tipping" function and, after an operation, causes an automatic movement of the sun blind. Each of these described movements for the opening or closing can be stopped by another operation of the rocker key 12.

The multipart sliding roof 11 is controlled by way of a rotary switch 20. This rotary switch 20 is connected with a control unit 14 which is operable to detect the position of the individual parts of the multipart sliding roof before the operation of the rotary switch 20 and, on the basis of a new selected switching position of the rotary switch 20, triggers a corresponding control of a motor M1 for the first sliding roof part SD1 or of a motor M2 for the second sliding roof part SD2. The motor M1 for controlling the first sliding roof section SD1 is mechanically also coupled with the wind deflector WA, so that an opening of the first sliding roof section SD1 automatically also results in an adjusting of the wind deflector WA. During a triggering of the motor M1 for the opening of the first sliding roof part SD1, a tilting of the wind deflector WA therefore takes place at the same time in a restrictedly controlled manner. In this case, the slope of the wind deflector WA, as a function of the opening width of the first sliding roof section, is controlled such that a completely open first sliding roof section SD1 causes a maximal tilting of the wind deflector WA.

The control unit 14 is connected with the supply voltage UB of the battery of the vehicle and is linked with additional control units of the vehicle and/or sensors for detecting the operating condition and receives, for example, by way of a CAN bus, additional information required for controlling the multipart sliding roof. Thus, it becomes possible, for example, to analyze the information of a schematically depicted sun sensor SS or of a rain sensor RS and, when a permissible sun radiation is exceeded, operate the sun blind SR or, at the start of rain, close the multipart sliding roof. Furthermore, the control unit 14 coordinates the controlling of the three driving motors M1, M2 and MR in order to prevent a jamming in the case of a superimposed time sequence of the individual movable roof parts.

Figure 2:
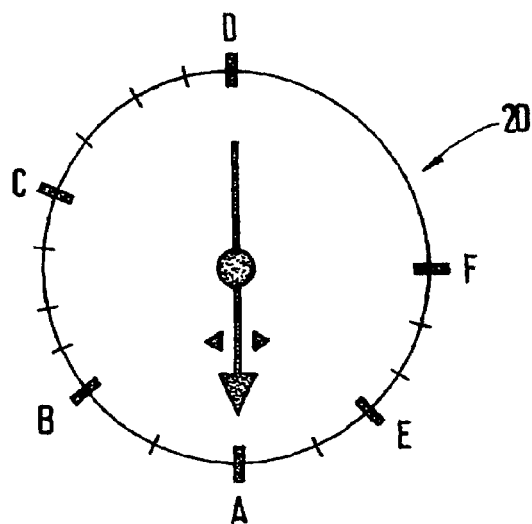
FIG. 2 is a view of a rotary switch for the controls of the multipart sliding roof depicted in FIG. 1.

FIG. 2 shows the rotary switch 20 for the selection of the different positions of the multipart vehicle roof. The illustrated rotary switch 20 shows 16 positions which can be preselected, six positions A to F being defined as preferred positions which are provided as haptic switching points. However, this illustrated construction of the rotary switch 20 is only one possibility of selecting various opening positions. It also contemplated according to other preferred embodiments that, in a simplified form, different selection positions are eliminated or that individual positions are combined. Before the multipart sliding roof is released for a movement, various conditions, which have to be present, are defined in the control unit 14. Otherwise, the control unit 14 will not release the movement. One of these conditions is the querying of the ignition. Only if the control unit 14 recognizes an ON ignition, will a release signal to the driving motors take place.

Figure 3A:
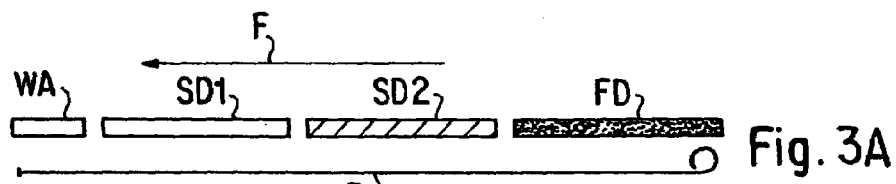
FIGS. 3A–3F are respective schematic sectional views of various positions of a multipart sliding roof which can be achieved with the apparatus and methods according to preferred embodiments of the present invention.
Figure 3B:
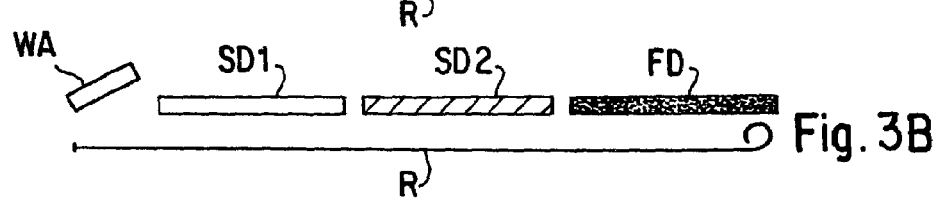
Figure 3C:
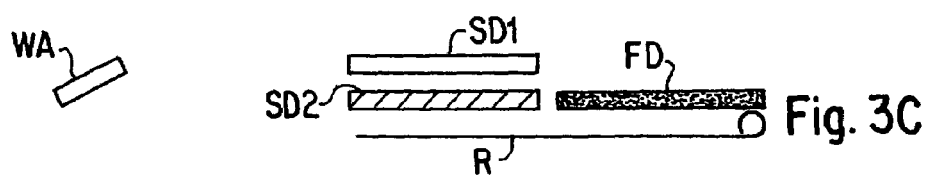

FIGS. 3A–3F indicate six different opening positions of the multipart sliding roof of the vehicle. Here, the respective FIGS. 3A to 3F correspond to a preferred position A to F of the rotary switch 20 from FIG. 2. In FIG. 3A, which corresponds to the switching position A, the wind deflector WA, the sliding roof 1 SD1, the sliding roof 2 SD2 and the sun blind R are closed. When the rotary switch 20 is now moved from position A to position B, the wind deflector WA opens in such a manner that it takes up an inclined position, as illustrated in FIG. 3B. The controlling of the opening angle can take place here as a function of the vehicle speed, which is monitored by the schematically depicted vehicle speed sensor VSS.

Figure 3D:
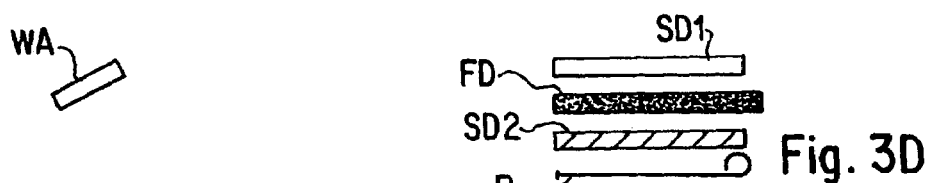

During a continued rotation of the rotary switch 20 to position C, the sliding roof part 1 SD1 opens in such a manner that it is lifted out of its closed position and subsequently moves toward the rear over the sliding roof part SD2. Simultaneously, the blind R opens so wide that it, in turn, opens up at least the now exposed roof opening so that the opening positions exist according to FIG. 3C. When the switch 20 is moved further in this direction to position D, the opening form of the multipart sliding roof will exist which is shown in FIG. 3D. This means that the wind deflector WA is adjusted and the two sliding roof parts SD1 and SD2 are in the open position. In this case, the first sliding roof section SD1 is moved over the fixed roof FD and the sliding roof section SD2 is moved under the fixed roof FD of the vehicle. The sun blind R is also again restrictedly controlled if it has not already been moved by the driver by operating the switch 12 into the corresponding open position. In addition, a function may also be integrated here which closes by a definable amount the second sliding roof section SD2 again from the completely open position when the vehicle speed is above a defined threshold. As a result, unpleasant rumbling noises in the vehicle interior can be avoided or at least reduced.

The described switching positions A, B, C and D are situated in one rotating direction of the switch 20 and provide the logical sequence of movements of the individual roof sections, starting from the closed roof 3A to the completely open roof 3D. Corresponding to a logical sequence, here first the wind deflector WA, then the first sliding roof section SD1 and subsequently the second sliding roof section SD2 are opened. During the closing, the control takes place in the reverse sequence. This means that, when the rotary switch 20 is moved from the switching position D into the switching position A, first, the sliding roof section SD2 is closed, then the sliding roof section SD1 and finally the wind deflector WA, in which case the controlling of the first sliding roof section SD1 and of the wind deflector WA takes place on the basis of the joint driving motor such that the two components reach the closed position approximately simultaneously.

Figure 3E:
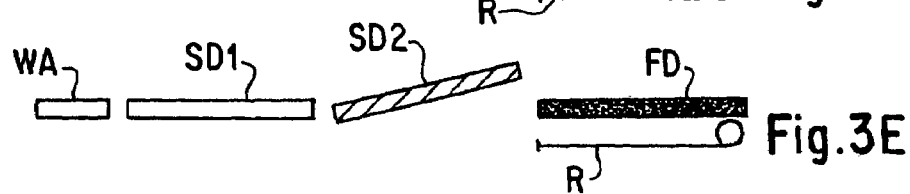

When, starting from position A, the rotary switch 20 is moved into the other rotating direction, at the switching position E, a lifting of the second sliding roof section SD2 takes place into a lifted position as shown in FIG. 3E.

Figure 3F:
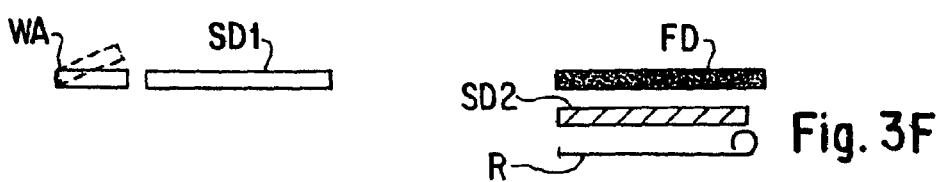

The switching position F causes an opening of the second sliding roof section SD2 in such a manner that, starting from the lifted position of the second sliding roof section SD2, first the second sliding roof section SD2 is lowered and is subsequently moved under the fixed roof FD of the vehicle as shown in FIG. 3F. Optionally, in switching position F, the wind deflector WA can also be adjusted, which is indicated in FIG. 3F by indicating the wind deflector by a broken line. The sun blind is simultaneously moved into an open position. The following should be stated concerning the switching position F (FIG. 3F). When the rotary switch is switched directly from the switching position A without any intermediate stopping of the rotary switch 20 to position F, this will be detected by the control unit 14 and the passing through the switching position E (FIG. 3E) remains insignificant. The above applies to all switching positions to be taken up. When detecting a switching operation at the rotary switch 20, the control unit has all information available concerning the momentary positions of the individual roof sections, and, starting from the "starting situation" and the now desired roof position, it will determine the respectively safest and fastest manner of controlling the individual driving motors. This means, for example, that, starting from switching position D (FIG. 3D) as the "starting position" and in the case of a desired end position F (FIG. 3F), the second sliding roof section SD2 remains in the open position, while the first sliding roof section SD1 and the wind deflector WA are closed.

The control unit 14 coordinates the movements of the individual sections of the multipart sliding roof. In the case of an immediately successive operation of the switch for the sun blind and of the switch for the full-size roof, the control unit has every momentary position of the roof paths stored in memory and will then, successively or in an overlapping manner relative to time, initiate a movement into the selected end positions. In this case, it may happen that an already initiated movement of the sun blind is stopped; then the roof section or sections are moved into their end position; and subsequently the movement of the sun blind is resumed.

FIG. 2 shows additional switching points between the six preferred positions, which switching points each determine only a partial taking-up of the end position. As a result, it becomes possible, for example, to open the first sliding roof section SD2 only partially. Since the wind deflector and the first sliding roof section SD1 are mechanically coupled, it becomes possible to eliminate the switching position B as a preferred haptic position, which only opens the wind deflector WA.

As initially mentioned, various blocking functions are available for the control. Thus, the sliding roof SD1 cannot be opened when SD2, as in position E (FIG. 3E), is in the lifted position.

The sun blind should not be set in the open roof section, so that the sun blind is also moved into an open position without the operation of the switch 12, when one of the sliding roof sections SD1 or SD2 is opened.

As another comfort function according to certain preferred embodiments, it is contemplated to provide an external operating unit, for example, at the ignition key, which permits the ventilation of the vehicle, particularly when the vehicle interior is overheated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method of controlling a multipart sliding roof for a motor vehicle having a roof opening, a first angularly movable roof section, a second longitudinally movable roof section, a third longitudinally movable roof section, and a movable operating element selectively movable between at least six different switching positions corresponding to respective predetermined roof opening conditions, said method comprising:
    monitoring a starting roof opening condition, movement of the operating element to a switching position corresponding to a selected predetermined roof opening condition, and
    performing a logical sequence of movements of the individual roof sections so as to move the roof sections from the starting roof opening condition to the selected predetermined roof opening condition with the logical sequence depending on the starting roof opening condition,
    wherein after opening, the third roof section which is an, which are individual sliding roof section is closed again by a definable amount from a completely opened position when a defined vehicle speed is exceeded, and
    wherein said logical sequence of movements includes blocking opening movement of at least one of the roof sections when another of the roof sections is in a particular one of said opening conditions.

2. Method according to claim 1, wherein the operating element is a rotary switch with at least six preferred switching positions.

3. Method according to claim 1, wherein a sun blind is provided on the interior side of the vehicle of the multipart sliding roof, which sun blind is coupled with a sun sensor and, when a massive sun radiation is detected, is automatically moved into the closing position.

4. Method according to claim 3, wherein, when the individual roof sections are controlled for the opening, the sun blind is automatically moved into such a position that it comes to a stop at least behind a front edge of the roof opening.

5. Method according to claim 1, wherein the first angularly movable roof section is a wind deflector which can be adjusted as a function of the driving speed.

6. Method according to claim 2, wherein the first angularly movable roof section is a wind deflector which can be adjusted as a function of the driving speed.

7. Method according to claim 3, wherein the first angularly movable roof section is a wind deflector which can be adjusted as a function of the driving speed.

8. Method according to claim 4, wherein the first angularly movable roof section is a wind deflector which can be adjusted as a function of the driving speed.

9. A multipart sliding roof assembly for a motor vehicle comprising:
    a roof opening;
    a first angularly movable roof section;
    a second longitudinally movable roof section;
    a third longitudinally movable roof section;
    a movable operating element selectively movable between at least six different switching positions corresponding to respective predetermined roof opening conditions; and
    a control unit responsive to starting roof opening conditions and to movement of the operating element to a switch position corresponding to a selected predetermined roof opening condition to perform a logical sequence of movements of the individual roof sections so as to move the roof sections from the starting roof opening condition to the selected predetermined roof opening condition with the logical sequence depending on the starting roof opening condition,
    wherein after opening, the third roof section which is an, which are individual sliding roof section is closed again by a definable amount from a completely opened position when a defined vehicle speed is exceeded, and
    wherein said logical sequence of movements includes blocking opening movement of at least one of the roof sections when another of the roof sections is in a particular one of said opening conditions.

10. A multipart sliding roof assembly according to claim 9, wherein the operating element is a rotary switch with at least six preferred switching positions.

11. A multipart sliding roof assembly according to claim 9, wherein a sun blind is provided on the interior side of the vehicle of the multipart sliding roof, which sun blind is coupled with a sun sensor and, when a massive sun radiation is detected, is automatically moved into the closing position.

12. A multipart sliding roof assembly according to claim 11, wherein, when the individual roof parts are controlled for the opening, the sun blind is automatically moved into such a position that it comes to a stop at least behind a front edge of the roof opening.

13. A multipart sliding roof assembly according to claim 9, wherein the first angularly movable roof section is a wind deflector which can be adjusted as a function of the driving speed.

* * * * *